July 12, 1960

A. G. BODINE, JR 2,944,623

JET ENGINE NOISE REDUCER

Filed Sept. 2, 1955

INVENTOR.
ALBERT G. BODINE JR.
BY

July 12, 1960 A. G. BODINE, JR 2,944,623
JET ENGINE NOISE REDUCER

Filed Sept. 2, 1955 2 Sheets-Sheet 2

*INVENTOR.*
ALBERT G. BODINE JR.
BY
ATTORNEY

# United States Patent Office 2,944,623
Patented July 12, 1960

2,944,623

JET ENGINE NOISE REDUCER

Albert G. Bodine, Jr., 13120 Moorpark St.,
Van Nuys, Calif.

Filed Sept. 2, 1955, Ser. No. 532,202

3 Claims. (Cl. 181—43)

This invention relates generally to jet engines for aircraft, and is addressed specifically to the problem of jet noise reduction.

Jet noise from high pressure sonic velocity jets, e.g., those characterized by De Laval effects, is considered to be attributable to a substantial degree to the violence with which the jet discharge gases enter and mix with the atmospheric air or the slip stream surrounding the jet. Great turbulence is produced in the annular region between the high velocity jet "core" and the surrounding lower velocity slip stream air. The relative motion of the jet "core" to the surrounding air is such as to generate a series of vortices which trail after the aircraft and are strong individual sources of noise. Efforts to combat jet noise have been and are being made, such as experimentation with "dragon's-teeth" around the perimeter of the jet nozzle to slow down the outer layer of the jet by drag, so-called by-pass engines which pump a stream of moderate velocity air around the jet, and use of aspiration nozzles. These, however, have fallen far short of meeting the problem.

The general object of the present invention is accordingly the provision of improved means for reducing the violence of the impact of the stream of high velocity jet discharge gases on the surrounding atmosphere or slip stream air.

My invention contemplates broadly the imparting of a spin to the jet discharge gases at or immediately aft of the choked throat of the jet nozzle, in a manner to cause the jet stream to expand or diffuse to an appreciable extent, aft of the nozzle, by centrifugal force. The spinning and expanding jet stream reduces its own rearward velocity, and consequently is enabled to mix with the slip stream with reduced turbulence. Noise generation is thereby materially reduced. According to recognized authorities, jet noise varies with the eighth power of jet velocity. It can be seen that even a small velocity reduction in the outer regions of the jet stream will therefore result in a substantial reduction in jet noise. The present invention makes possible a material jet velocity reduction, and the degree of noise reduction attained thereby is correspondingly large. The tendency for vortex generation is also reduced by the lowered relative velocity between jet gases and slipstream. Moreover, since generated spin of jet gases about the longitudinal axis of the jet is at a substantial angle to the axes of vortices produced by relative longitudinal motion between the jet gases and the slip stream, there is also a tendency to destabilize and break up the usually generated noise-producing vortices.

The invention will be better understood by the following detailed description of certain present illustrative embodiments thereof, reference for this purpose being had to the accompanying drawings wherein.

The present invention is applicable to jet engines of any of the types having a jet discharge nozzle and a high pressure differential thereacross, including turbo-jets, ram jets, rockets, etc. The drawings have accordingly illustrated only the rearward portion of the jet duct together with the nozzle, a nacelle shroud, and the improvements of the present invention.

Figure 1:
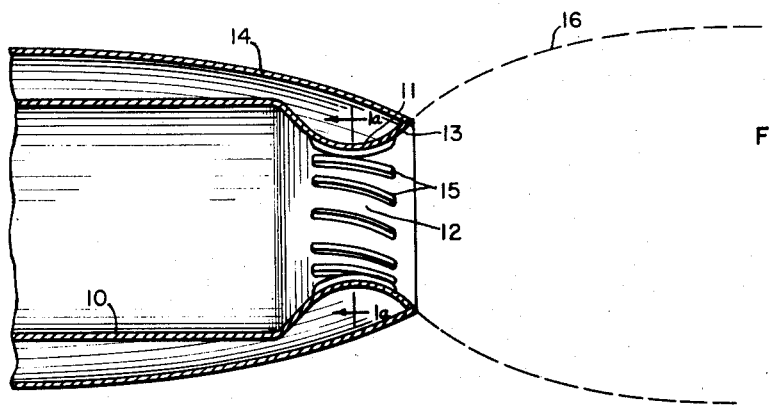
Fig. 1 is a longitudinal medial sectional view through the aft section of the jet duct and nozzle of a jet engine provided with improvements of the present invention.
Figure 1A:
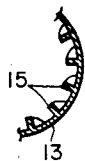
Fig. 1a is a fragmentary section taken in accordance with the line 1a—1a of Fig. 1.

In the illustrative embodiment of Figs. 1–1a, the jet duct is shown at 10, and terminates in jet nozzle 11 having choked throat 12 and divergent aft section or flare 13. A nacelle shroud 14 is shown as joining the rearward edge of the nozzle.

Within throat 12 are a set of twisted stator vanes 15, adapted to impart a tangential component of velocity, i.e., a spin, to the jet gases passing through the nozzle, particularly in the outer region of the jet stream. The high velocity spinning gases issuing from the choked throat 12 expand to an enlarged diameter aft of the nozzle by reason of centrifugal force. The enlarged jet column has accordingly a reduced unit velocity aft of the engine, though, of course, the mass of gases discharged per unit time remains unaltered, and the product of the mass of gases passing through a given cross sectional plane and the average velocity of such gases remains likewise unaltered. The enlarged column of gases issuing from the jet nozzle, thus reduced in velocity, particularly in its outer regions, thus plunges into the outside air with lessened relative velocity with respect to the slipstream, and therefore with lessened violence, reduced turbulence, and materially lessened noise. Further, as mentioned hereinabove, the spinning jet tends to destabilize noise producing vortices generated in the region between the jet column and the slipstream.

In Fig. 1, the jet nozzle is terminated a short distance aft of the constricted throat, permitting a substantial expansion of the issuing jet column, such as indicated by the dashed lines 16. It will of course be understood that the effect of the slipstream around the nacelle shroud 14 is such as to limit and finally straighten out the expanding jet column, somewhat as indicated in Fig. 1.

Figure 2:
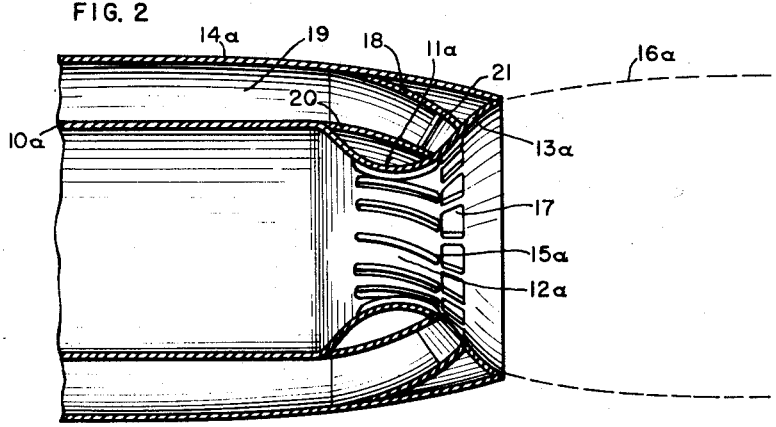
Fig. 2 is a view similar to Fig. 1 but showing a modification.
Figure 3:
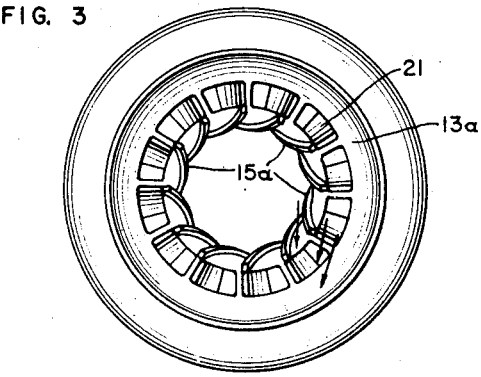
Fig. 3 is a rear end elevational view of the embodiment of Fig. 2.

In Figs. 2 and 3 I have shown a modified embodiment, having duct 10a, constricted nozzle 11a with throat 12a containing twisted vanes 15a, and nacelle shroud 14a. In this case, the divergent section 13a of the nozzle is extended further aft of the nozzle throat, and is so shaped as to extract a further thrust reaction on the surface thereof from the issuing jet column.

In addition, the embodiment of Figs. 2 and 3 shows a plurality of apertures 17 located in the flared aft section 13a of the nozzle, preferably just beyond the vanes 12a. A deflector plate or ring 18 is mounted within nacelle shroud 14a and engages the wall section of the nozzle just outside or beyond the apertures 17. The annular space 19 between jet duct 10a and shroud 14a is in this case utilized as a passageway for so-called "by-pass" air from the engine, and the ring 18 is faired into the shroud so as to provide a streamlined passage for this by-pass air to the discharge apertures 17. If desired, an additional ring 20 may be used to cover the pocket otherwise present owing to the constricted portion of the nozzle.

The by-pass air traveling rearwardly in passageway 19 is thus conveyed to and discharged through the apertures 17. A series of twisted stator vanes 21 are mounted in passageway 19 just ahead of apertures 17, whereby the by-pass air issuing from the apertures 17 will have imparted thereto a tangential component of velocity causing a spin about the longitudinal axis of the jet. The direction of the vanes 21 is made such that the spin direction of the discharged by-pass air and the spin direction of the jet column are the same. The spinning and expanding jet column and the similarly spinning by-pass air thus mix with a minimum of turbulence, both expanding by centrifugal force, and being discharged as indicated by the dashed lines 16a. The combined jet column and by-pass air are finally limited in their expansion, as in the case of Fig. 1, by the slipstream air surrounding the nacelle 14a.

Figs. 2-3 are further illustrative of an embodiment within the broad invention which imparts spin to the jet column by use merely of the spinning by-pass air, the vanes 15a being omitted. It will readily be appreciated that by discharging spinning air through the apertures 17 into the outer regions of the jet column, a spin will be imparted to the latter, causing a degree of expansion by centrifugal force, and a corresponding velocity reduction in the outer regions of the jet column. As explained hereinabove, such velocity reduction results in reduced violence and turbulence between the jet column and the outside air, with consequent noise reduction.

Figure 4:
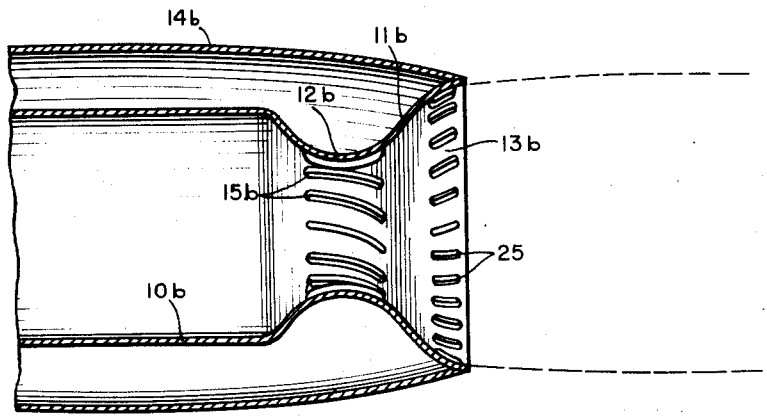
Fig. 4 is a view similar to Fig. 1 but showing another modification.
Figure 5:
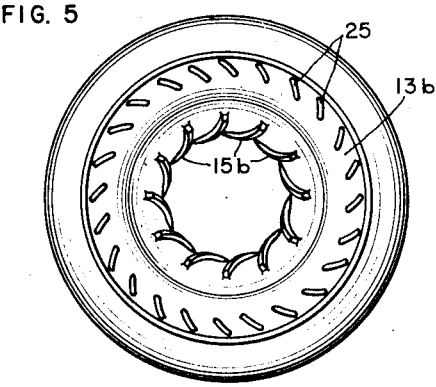
Fig. 5 is a rear end elevational view of the embodiment of Fig. 4.

Fig. 4 shows a still further embodiment of the invention, the jet duct being here indicated at 10b, the nozzle at 11b, nozzle throat at 12b, twisted vanes at 15b, and the nacelle shroud at 14b. In this case, the divergent aft section or flare 13b of the nozzle is still further extended, and the divergence of its terminal portion gradually reduced, as indicated. Within this terminal portion of the nozzle section 13b is mounted a set of straightener vanes 25, twisted in the opposite direction from the vanes 15b, so as to counteract and stop or reduce the spin introduced by the vanes 15b. According to this embodiment, therefore, the jet discharge gases are spun within the nozzle throat, caused to expand to an enlarged diameter within the divergent portion of the nozzle immediately aft of the nozzle throat, and then reduced in spin velocity before final discharge into the slipstream. This embodiment has the advantage that the column of discharge gases issuing from the engine is of enlarged diameter, and correspondingly reduced velocity relative to the slipstream, but at the same time, the tendency for further expansion beyond the trailing edge of the nozzle is materially reduced or stopped, whereby the issuing jet discharge gases leave the nozzle in a direction which is more or less parallel with the slipstream air surrounding the shroud 14b.

Figure 6:
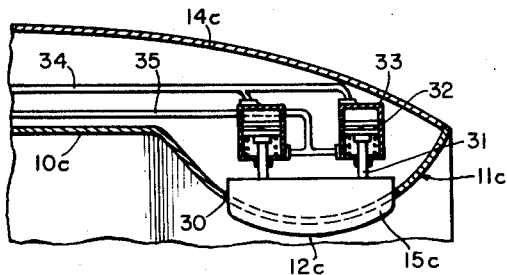
Fig. 6 is a fragmentary view taken from Fig. 1 but showing a modification.
Figure 7:
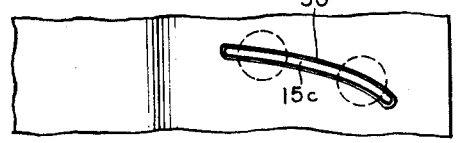
Fig. 7 is a fragmentary elevational view looking upwards in Fig. 6.

Figs. 6 and 7 show a modification of the embodiment of Figs. 1 and 2, according to which the twisted vanes are made retractable into the nozzle throat. Here, the jet duct is indicated at 10c, the nozzle at 11c, nozzle throat at 12c, twisted vanes at 15c, and nacelle shroud at 14c. The vanes 15c project through a curved slot 30 in the nozzle throat, and are carried by plunger rods 31 projecting from pistons 32 in hydraulic cylinders 33, the pistons being movable, to project or retract the vanes, by hydraulic fluid in lines 34 and 35 connected to opposite ends of the cylinders, and understood to be controlled by a suitable selector valve. The hydraulic lines may of course be served from the hydraulic system commonly present on modern aircraft. With this system, the jet spin effect can of course be modified or eliminated as desired.

It is believed that the foregoing description of typical illustrative embodiments will make clear the principle of the invention. It will of course be understood that the present drawings and accompanying description are merely illustrative, and that various changes in design, structure and arrangement may be made without departing from the spirit and scope of the invention or of the appended claims.

I claim:

1. Jet engine noise reducing means comprising the combination of: a non-rotatable sonic velocity jet duct and final exit nozzle having a constricted throat and a circumferential aft end, and a set of twisted vanes in said nozzle in the region of the constricted throat thereof, anterior of said aft end, and in the path of gas flow through the nozzle at sonic velocity, for imparting spin to the column of jet gases passing through said nozzle, whereby said column is radially expanded by centrifugal force.

2. The subject matter of claim 1, including also means for discharging gas inside said nozzle in the peripheral region of the column of expanding gases, beyond said constricted throat, with a component of velocity tangential to said column of expanding gases and with the same spin direction as that imparted to said column of gases by said twisted vanes.

3. The subject matter of claim 1, wherein the nozzle has a flared section aft of the constricted throat, and including a set of vanes in said flared section twisted oppositely to the first mentioned vanes for reducing the spin of the gases after a given radial expansion of the gas column has been attained.

References Cited in the file of this patent

UNITED STATES PATENTS

| | | |
|---|---|---|
| 1,383,150 | Price | June 28, 1921 |
| 1,637,347 | Nelson | Aug. 2, 1927 |
| 1,816,245 | Wolford | July 28, 1931 |
| 2,093,469 | Saint-Jacques | Sept. 21, 1937 |
| 2,403,403 | Sauer | July 2, 1946 |
| 2,473,103 | Lathers | June 14, 1949 |
| 2,650,752 | Hoadley | Sept. 1, 1953 |
| 2,664,700 | Benoit | Jan. 5, 1954 |
| 2,696,709 | Oulianoff | Dec. 14, 1954 |
| 2,722,801 | Lombard | Nov. 8, 1955 |
| 2,807,137 | Meulien et al. | Sept. 24, 1957 |

FOREIGN PATENTS

| | | |
|---|---|---|
| 841,015 | France | Jan. 28, 1939 |
| 1,084,419 | France | July 7, 1954 |

OTHER REFERENCES

Ser. No. 340,799, A. Hettich (A.P.C.), published May 25, 1943.

"Flight" (publication), July 8, 1955 (pp. 57 to 59).